United States Patent [19]

Takeuchi et al.

[11] Patent Number: 5,611,958

[45] Date of Patent: Mar. 18, 1997

[54] INFRARED PHOSPHOR AND MATERIAL HAVING LATENT IMAGES AND OPTICAL READING SYSTEM USING SAID PHOSPHOR

[75] Inventors: Yoji Takeuchi; Toshio Oshima, both of Toride; Ryuzo Fukao, Ibaraki-ken; Hisao Kanzaki, Toride, all of Japan

[73] Assignee: Hitachi Maxell, Ltd., Osaka, Japan

[21] Appl. No.: 238,068

[22] Filed: May 4, 1994

[30] Foreign Application Priority Data

| | | | |
|---|---|---|---|
| May 11, 1993 | [JP] | Japan | 5-109595 |
| May 11, 1993 | [JP] | Japan | 5-109596 |
| Sep. 24, 1993 | [JP] | Japan | 5-261634 |
| Sep. 24, 1993 | [JP] | Japan | 5-261635 |

[51] Int. Cl.$^6$ .......................... C09K 11/70; C09K 11/81; G06K 19/14; B32B 33/00
[52] U.S. Cl. .................. 252/301.4 P; 250/271; 428/913; 428/690; 235/491
[58] Field of Search .............. 202/301.4 P; 250/271; 423/263, 306; 235/491; 428/913, 690

[56] References Cited

U.S. PATENT DOCUMENTS

| | | | |
|---|---|---|---|
| 4,107,273 | 8/1978 | Suzuki et al. | 252/301.4 P |
| 4,149,989 | 4/1979 | Kashiwada et al. | 252/301.4 P |
| 4,202,491 | 5/1980 | Suzuki | 235/491 |
| 5,220,166 | 6/1993 | Takeuchi et al. | 250/271 |

FOREIGN PATENT DOCUMENTS

| | | |
|---|---|---|
| 2382490 | 9/1978 | France . |
| 2750321 | 5/1978 | Germany . |
| 2013233 | 8/1979 | United Kingdom . |

*Primary Examiner*—Melissa Bonner

[57] ABSTRACT

The invention provides a phosphor excited by infrared rays to emit infrared rays which has a nonacicular particle shape and a particle size of 4 μm or smaller after being synthesized. The phosphor preferably comprises an oxoacid salt-containing compound including at least one element selected from the group consisting of Nd, Yb and Er. The invention further provides a material having a latent image pattern comprising said phosphor and an optical reading system which use the material having a latent image pattern.

11 Claims, 10 Drawing Sheets

FIG. 9A EXAMPLE 1
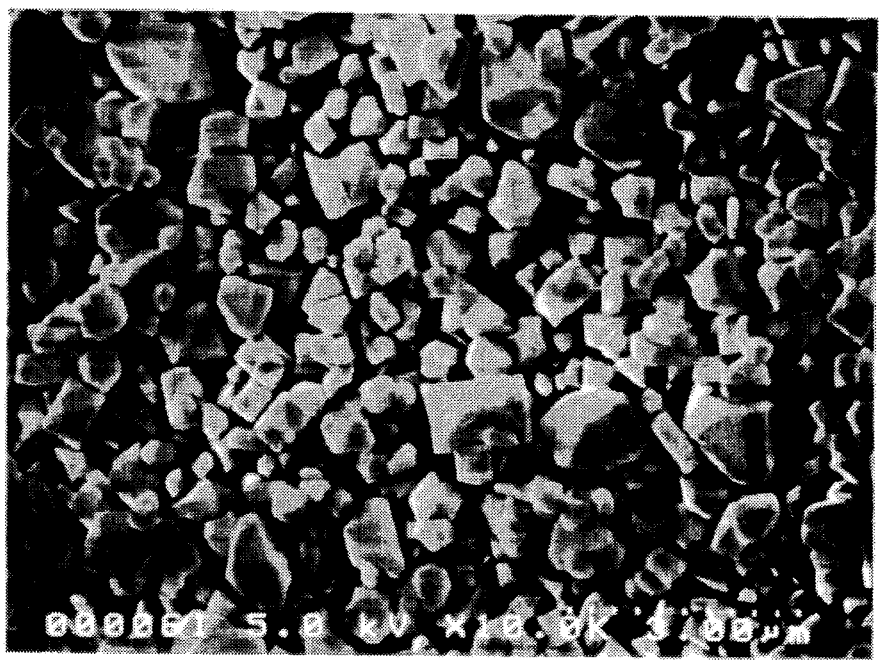
FIG. 9B COMPARATIVE EXAMPLE
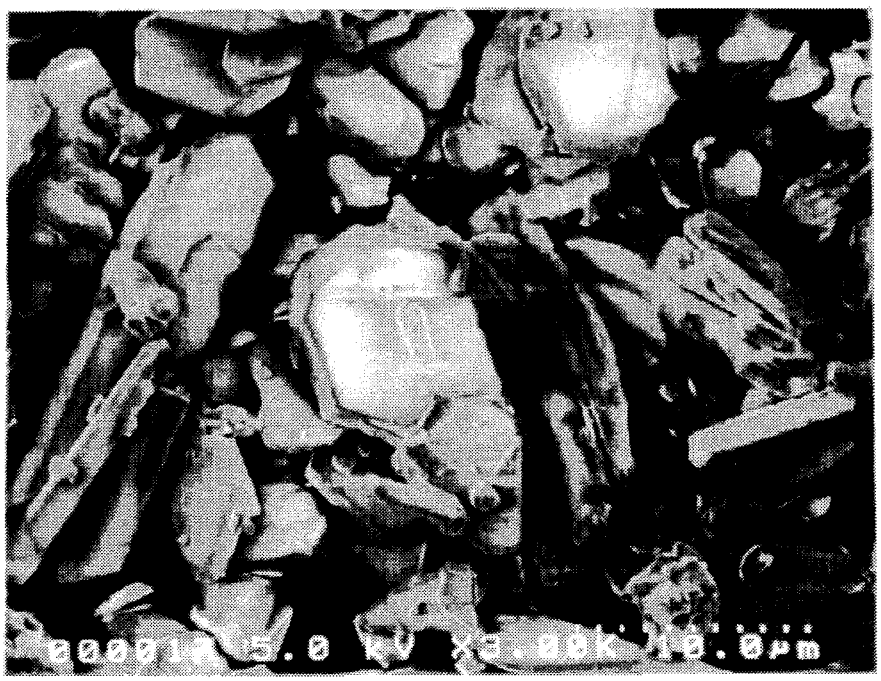

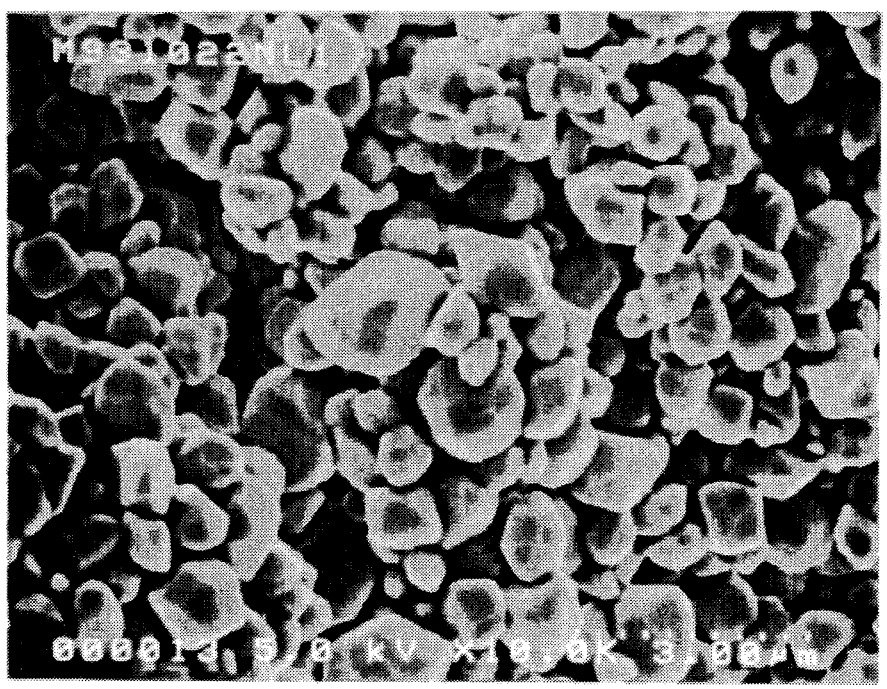
FIG. 9C EXAMPLE 10

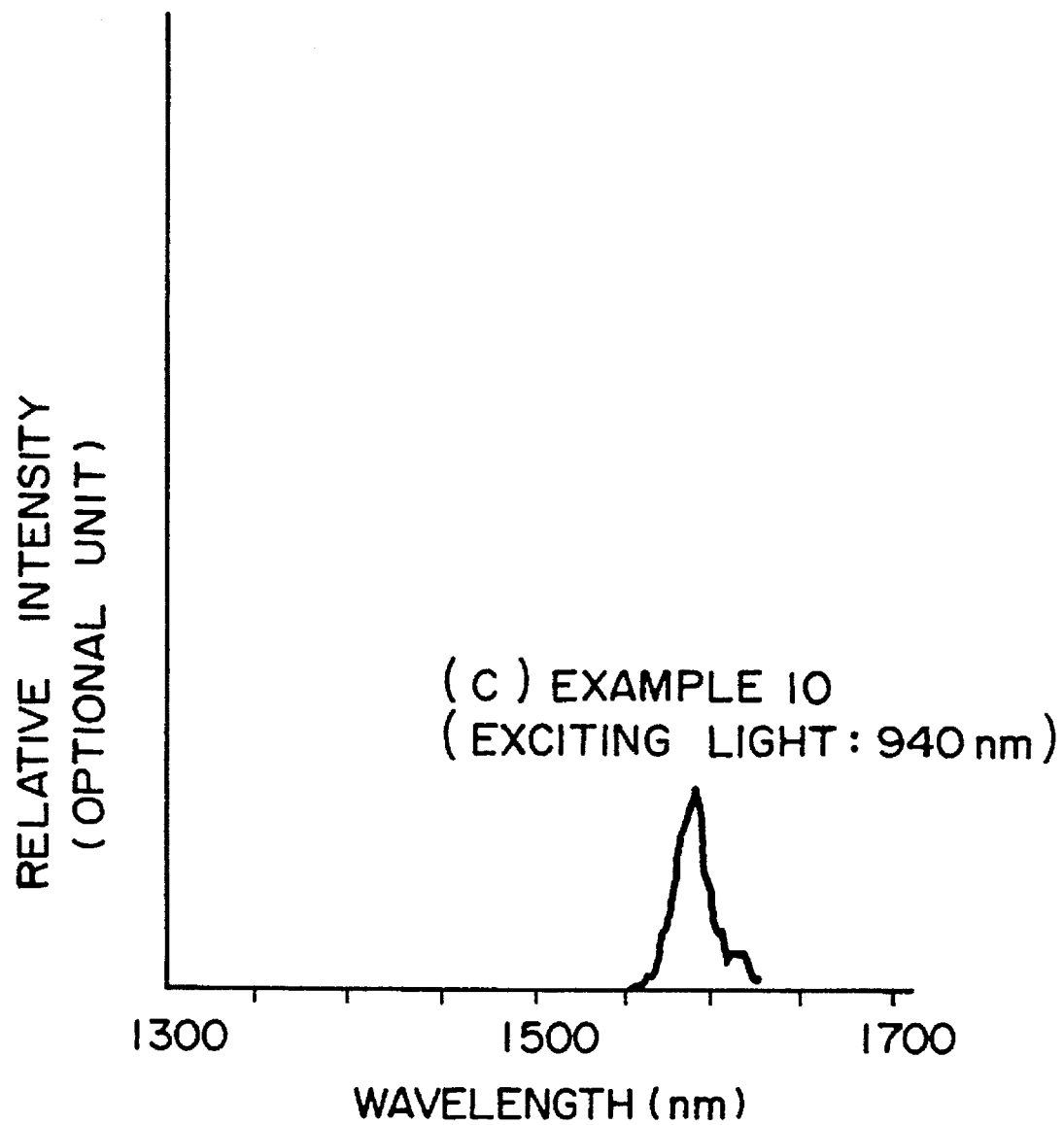

INFRARED PHOSPHOR AND MATERIAL HAVING LATENT IMAGES AND OPTICAL READING SYSTEM USING SAID PHOSPHOR

BACKGROUND OF THE INVENTION

The present invention relates to an infrared phosphor which is excited by irradiation with infrared rays to emit light of infrared wavelength region, and to a material having latent images and an optical reading system which use said infrared phosphor.

Recently, in various industries such as the distribution industry, control of goods by means of bar codes is extensively conducted and furthermore, bar codes are printed on various prepaid cards and passing cards and these bar codes are read by optical reading apparatuses such as scanners to perform the desired actions. Moreover, various attempts have been made to apply forgery preventive means to credit cards and prepaid cards or to detect forged cards. According to one of them, the marks such as bar codes are printed with an ink containing a phosphor by offset printing or by using an ink ribbon to form latent image marks, the latent image marks are irradiated with a semiconductor laser beam to excite the phosphor and the light emitted from the phosphor is received to read the bar code information by an optical reading apparatus.

The phosphors used in the above-mentioned method are those which are described in U.S. Pat No. 4,202,491.

However, the conventional phosphors have a large particle size of larger than 5 μm and cannot be used as they are in the inks used for offset printing or ink ribbons and they must be ground. During this grinding step, crystallinity and composition of the phosphors are damaged to cause considerable reduction in luminous intensity. Another problem is reduction in productivity due to the increase in the number of steps. For this reason, the systems in which the above phosphors are used have not yet been able to be put to practical use.

SUMMARY OF THE INVENTION

Accordingly, the object of the present invention is to solve the problem of the particle size encountered with the aforementioned conventional products, namely, to synthesize infrared phosphors of fine particles suitable to be used in inks for offset printing or ink ribbons without the step of grinding and to provide materials having latent images and optical reading systems which use the thus obtained infrared phosphors.

The first invention for attaining the above object is an infrared phosphor comprising an oxoacid salt-containing compound such as a phosphate which contains at least one of Nd, Yb and Er, for example, $YPO_4$:Yb and which has a nonacicular particle shape and has a particle size of 4 μm or smaller.

The second invention for attaining the above object is a material having latent images comprising a substrate and, provided thereon, an infrared ray exciting print layer, said print layer comprising an infrared transmitting binder such as wax, vinyl chloride-vinyl acetate copolymer or the like and an infrared phosphor comprising an oxoacid salt-containing compound such as a phosphate which contains at least one of Nd, Yb and Er, for example, $YPO_4$:Yb and which has a particle shape of nonacicular and has a particle size of 4 μm or smaller.

The third invention for attaining the above object is an optical reading system according to which an infrared phosphor of an oxoacid salt-containing compound such as a phosphate which contains at least one of Nd, Yb and Er, for example, $YPO_4$:Yb and which has a nonacicular particle shape and has a particle size of 4 μm or smaller is used, and said infrared phosphor is excited with infrared rays emitted from a light emitting device having a wavelength of luminescence center of 700–1,000 nm and a light emitted from the infrared phosphor is detected by a photo detector which can receive a light having a wavelength region of 800–1,600 nm emitted from the phosphor. The light from the phosphor is afterglow emitted from the phosphor when the emitting device is off.

The infrared phosphor used in the present invention which comprises an oxoacid salt-containing compound such as a phosphate which contains at least one of Nd, Yb and Er and which has a nonacicular particle shape and has a particle size of 4 μm or smaller is much smaller in particle size than the conventional infrared phosphors and can be applied to materials having latent images formed by offset printing or using ink ribbons and to optical reading systems. Thus, the present invention provides conspicuous effects for practical use of systems which use infrared phosphors.

BRIEF DESCRIPTION OF THE DRAWINGS

FIGS. 9A, 9B and 9C show scanning electron microphotographs of the particles in Example 1, Comparative Example 1 and Example 10, respectively.

FIG. 11 is an emission spectrum of the phosphor in Example 12.

Figure 1:
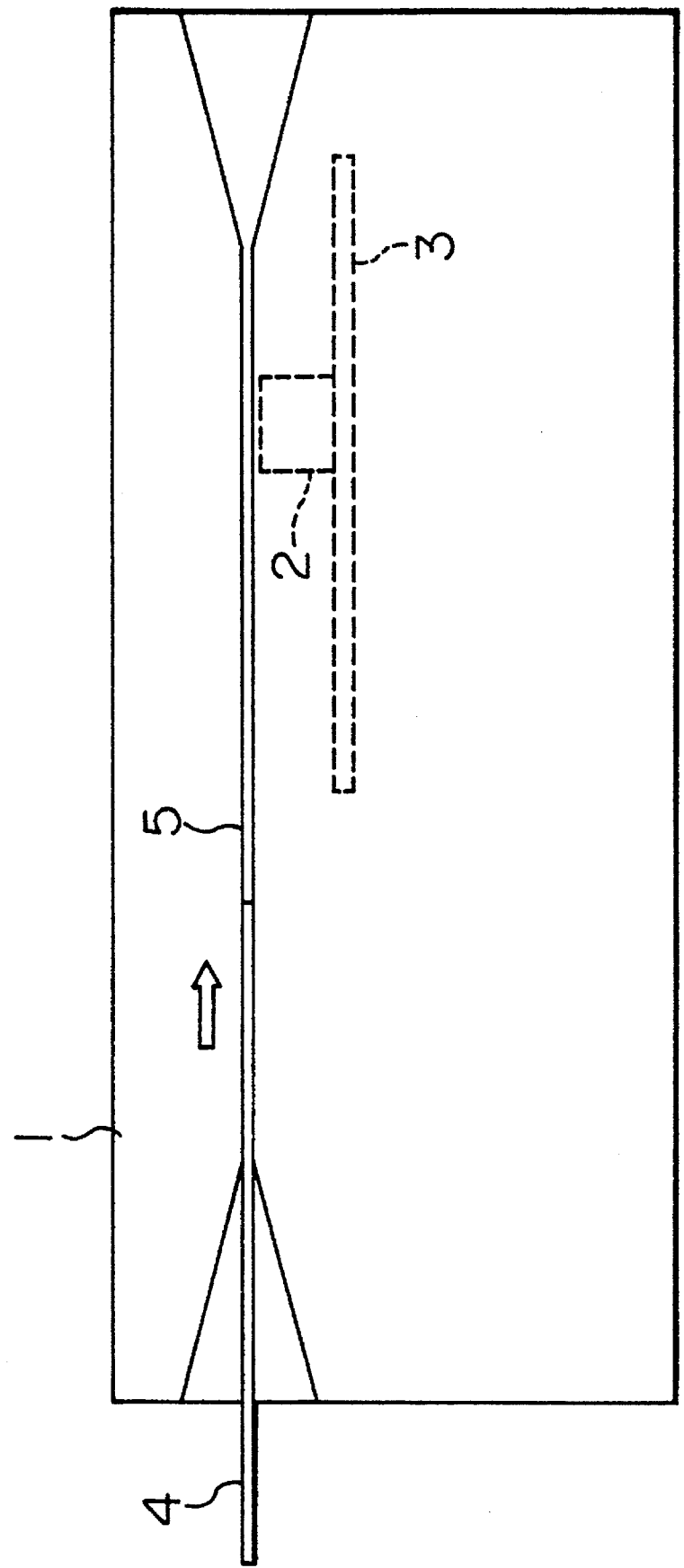
FIG. 1 is a sectional view of a bar code reader provided with the optical reading apparatus of an example according to the present invention.

In the drawings, the main reference numerals indicate the following:
1 Body of apparatus
2 Reading head
4 Card
9 Light emitting device
10 Photo detector
12 Bar code pattern
27 Card substrate
28 Bar code pattern
29 Print layer

DETAILED DESCRIPTION OF THE INVENTION

An example of the present invention will be explained referring to the drawings.

As shown in FIG. 1, the optical reading apparatus (bar code reader) is mainly composed of body 1, reading head 2 mounted in the body 1 and printed circuit board 3 which is connected to the reading head 2 and on which devices conducting various controls as mentioned hereinafter are mounted.

As shown in FIG. 1, a guide groove 5 through which the card 4 is allowed to pass is provided in the upper part of the body 1 and the reading head 2 is provided to face the card from the inner wall surface of the guide groove 5.

The card 4 bearing the bar code pattern described hereinafter is passed by hand through the guide groove 5 in the direction of the arrow, during which the information of the bar code pattern is optically read by the reading head 2.

Figure 2:
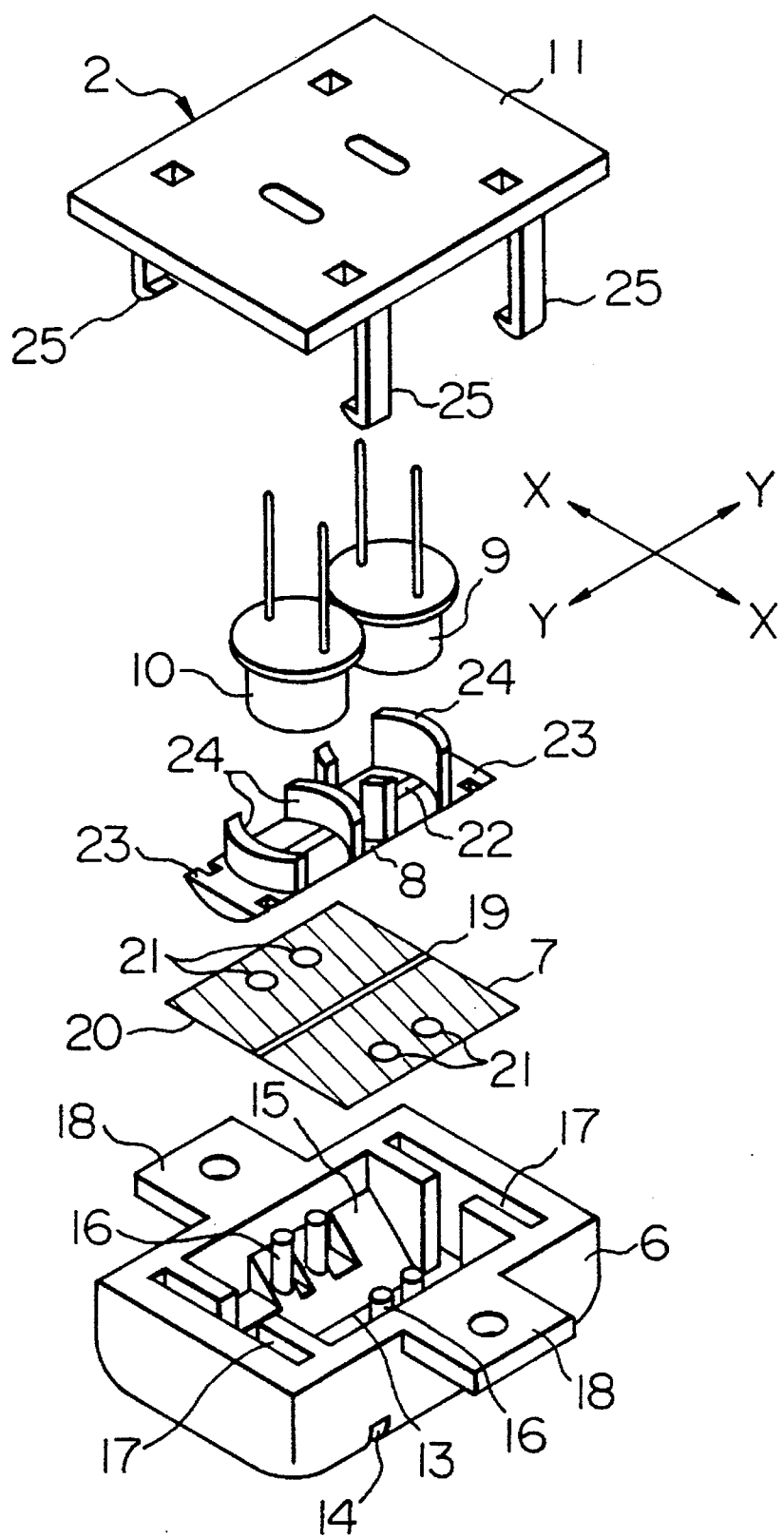
FIG. 2 is an oblique view of essential parts of a dismounted reading head in the optical reading apparatus of an example according to the present invention.

As shown in FIG. 2, the reading head 2 comprises head body 6 which also serves as a case, slit sheet 7 inserted into the head body 6, sheet pressing member 8 which also serves as a holder for devices, light emitting device 9 and photo detector 10 held by the sheet pressing member 8, and head cover 11 which covers the upper opening of the head body 6.

Figure 3:
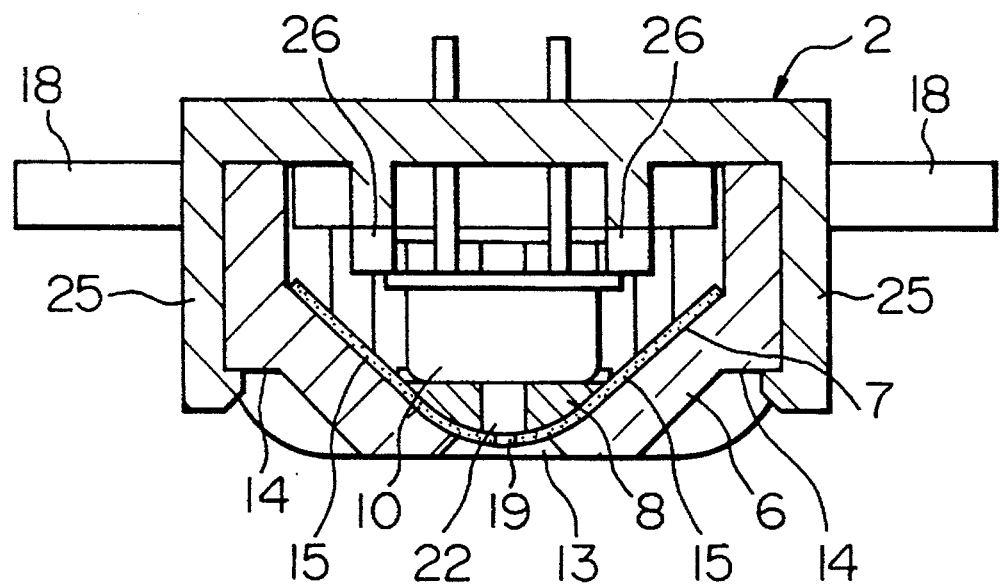
FIG. 3 is a sectional view of the reading head in the direction of X—X of FIG. 2.

At the center of the underside of the head body 6 is formed an opening 13 in parallel to the longitudinal direction of the bar code pattern 28 (see FIG. 5) formed on the card 4, and as shown in FIG. 3, engaging stepped portion 14 is provided on both sides of the underside of the head body.

Inside the head body 6, there are formed sheet-receiving faces 15, 15 inclined from both sides towards the opening 13, and pins 16 are provided midway the sheet-receiving faces 15, 15 projecting from the sheet-receiving face (see FIG. 2) and detent grooves 17 are provided at both end portions of the opening 13 (see FIG. 2).

As shown in FIG. 2 and FIG. 3, flange portions 18, 18 for fitting the reading head 2 to the body 1 are provided in the vicinity of the upper opening of head body 6 projecting from the head body.

As shown in FIG. 2, the slit sheet 7 is a flexible sheet comprising a base film of a transparent synthetic resin film such as polyethylene terephthalate (PET) film and a black print layer 20 formed on the base film excluding the slit-like light transmitting portion 19. Holes 21 are provided in the front and rear parts of the slit sheet 7 and the position of the slit sheet 7 on the head body 6 is determined by inserting the pins 16 of the head body 6 into the holes 21, respectively and the slit-like light transmitting portion 19 of the slit sheet 7 is positioned at the center of the opening 13 of the head body 6 as shown in FIG. 3.

In this example, the slit sheet 7 used comprises a transparent base film on which the print layer 20 is formed, but there may also be used a slit sheet of a metallic thin sheet such as of stainless steel in which a slit-like groove is formed.

As shown in FIG. 2 and FIG. 3, the underside of the sheet pressing member 8 is curved in conformity with the sheet receiving face 15 of the head body 6 and the slit sheet 7 is mechanically interposed between the underside of the sheet pressing member 8 and the sheet receiving face 15 of the head body 6 and the light transmitting portion 19 of the slit sheet 7 is pushed out into the opening 13 of the head body 6. A slit-like light controlling hole 22 is formed at the center of the sheet pressing member 8 and faces the light transmitting portion 19 as shown in FIG. 3.

Detent pieces 23, 23 having a T-type planar shape are provided integrally projecting from both sides of the sheet pressing member 8 (see FIG. 2) and the sheet pressing member 8 is mounted in the head body 6 by fixing the detent pieces 23, 23 into the detent grooves 17, 17 of the head body 6.

Figure 4:
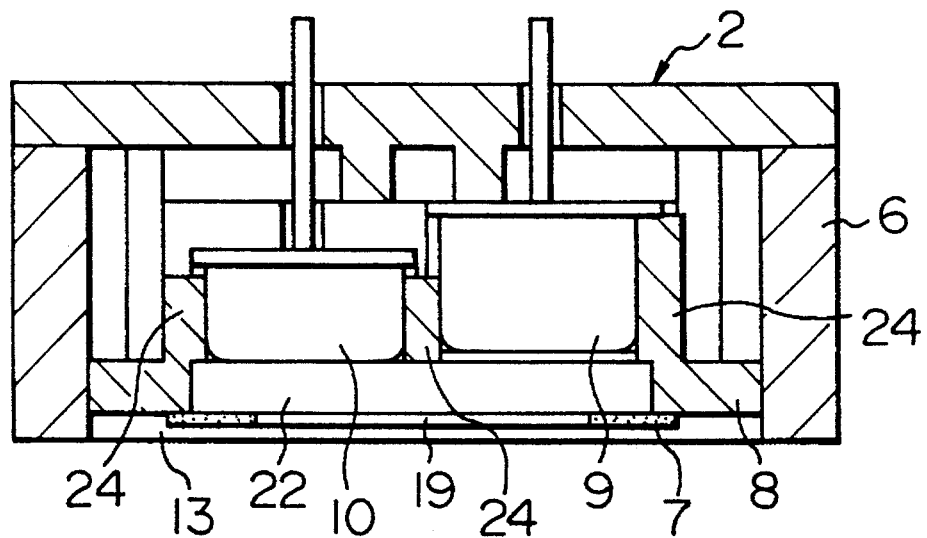
FIG. 4 is a sectional view of the reading head in the direction of Y—Y of FIG. 2.

Holding wall 24 in the form of a partial circular arc is provided extending upwardly on the sheet pressing member 8, and as shown in FIG. 4, the top portions of the light emitting device 9 and the photo detector 10 are inserted in the holding wall 24 and held therein.

As the light transmitting device 9, there may be used one which emits infrared rays including near infrared rays and has a center wavelength of 700–960 nm and a light transmitting diode of 810 nm and 940 nm in center wavelength is used in the example.

As the photo detector 10, there may be used photo detectors made of Ge, In-Ga-As, PbS, PbSe or the like which can detect the light in the range of 800–1,600 nm which is in the region of the emitted light wavelength.

Four engaging claws 25 are provided at the peripheral portion of the head cover 11 projecting therefrom downwardly, and as shown in FIG. 3, these engaging claws 25 are engaged with the engaging stepped portions 14 of the head body 6 and thus, fabrication of the reading head 2 is completed.

On the inner surface of the head cover 11 are provided leg portions 26 projecting downwardly as shown in FIG. 3. When mounting of head cover 11 is completed as shown in FIG. 3, the sheet pressing member 8 is pressed towards the sheet receiving face 15 by the leg portions 26 through the light emitting device 9 and photo detector 10 and the slit sheet 7 is surely fixed.

The construction of card 4 will be explained referring to FIG. 5 and FIG. 6. The card 4 is used, for example, as various prepaid cards, telephone cards, passage cards.

Figure 5:
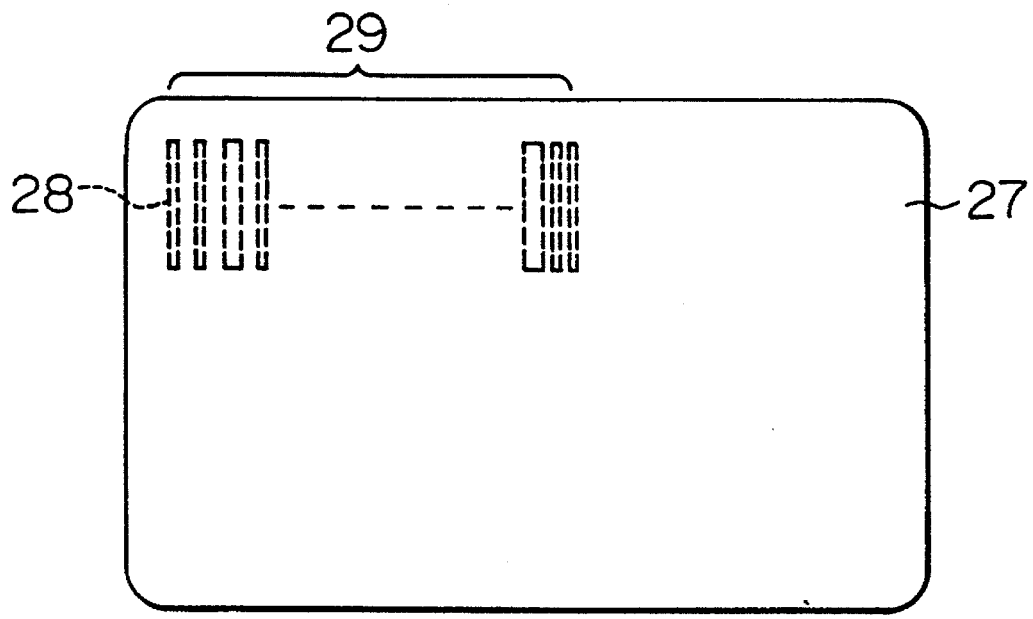
FIG. 5 is a plan view of the card used in the example according to the present invention.
Figure 6:
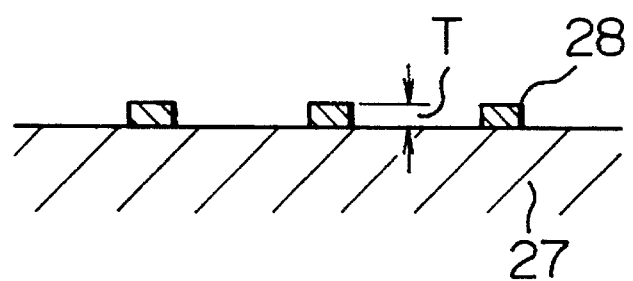
FIG. 6 is an enlarged sectional view of essential parts of the card.

FIG. 5 is a plan view of the card and FIG. 6 is an enlarged sectional view of essential parts of the card.

As shown in FIG. 5, print layer 29 having bar code pattern 28 of latent image is formed on the surface of card substrate 27. The card substrate 27 comprises, for example, a polyvinyl chloride sheet in which a white pigment such as titanium oxide is dispersed and retained and has the property to reflect infrared rays.

On the print layer 29 is printed a desired bar code pattern 28 with an ink comprising a phosphor which can be excited by irradiation with infrared rays and a transparent (infrared transmitting) binder in which the phosphor is dispersed and retained.

The phosphor comprises an oxoacid salt-containing compound containing at least one of Nd, Yb and Er. The oxoacid salt-containing compounds include, for example, vanadate compounds, phosphate compounds, borate compounds, molybdate compounds, tungstate compounds, etc. Especially preferred are phosphate compounds because they are superior in chemical resistance.

More specifically, the compounds represented by the following formulas are suitable as the phosphors.

$$Ln_xB_{1-x}PO_4$$

wherein B represents at least one element selected from Y, La, Gd, Bi, Ce, Lu, In, Pr and Tb; Ln represents at least one element selected from Nd, Yb and Er; and x is a numerical value of 0.01 to 0.99.

$$AB_{1-x}Ln_xP_yO_z$$

wherein A represents at least one element selected from Li, Na, K, Rb and Cs; B represents at least one element selected from Y, La, Gd, Bi, Ce, Lu, In, Pr and Tb; Ln represents at least one element selected from Nd, Yb and Er; x is a numerical value of 0.01 to 0.99; y is a numerical value of 1 to 5; and z is a numerical value of 4–14.

In the above formula, A is not necessarily needed. The values of x, y and z in the formula have not yet been definite, but are conjectured to be approximately in the above ranges.

Compositional ratio of the charged starting materials, firing temperature, and composition and particle size of the resulting infrared phosphors in specific preparation examples of the infrared phosphors are shown in Table 1.

All of the samples in Table 2 were prepared by firing the starting materials at the respective temperatures for 2 hours, treating the fired products with hot water, further treating them with nitric acid (1 mol), and then washing the products with water.

Figure 10A:
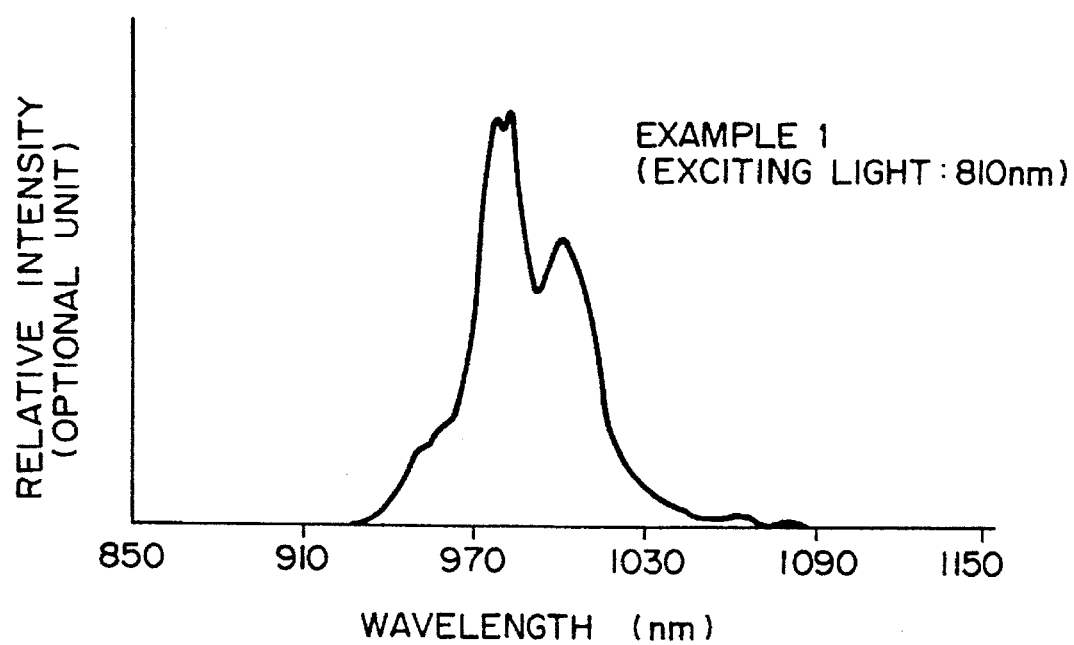
FIGS. 10A and 10B are an emission spectrum of the phosphor in Example 1 and Comparative Example 1, respectively.
Figure 10B:
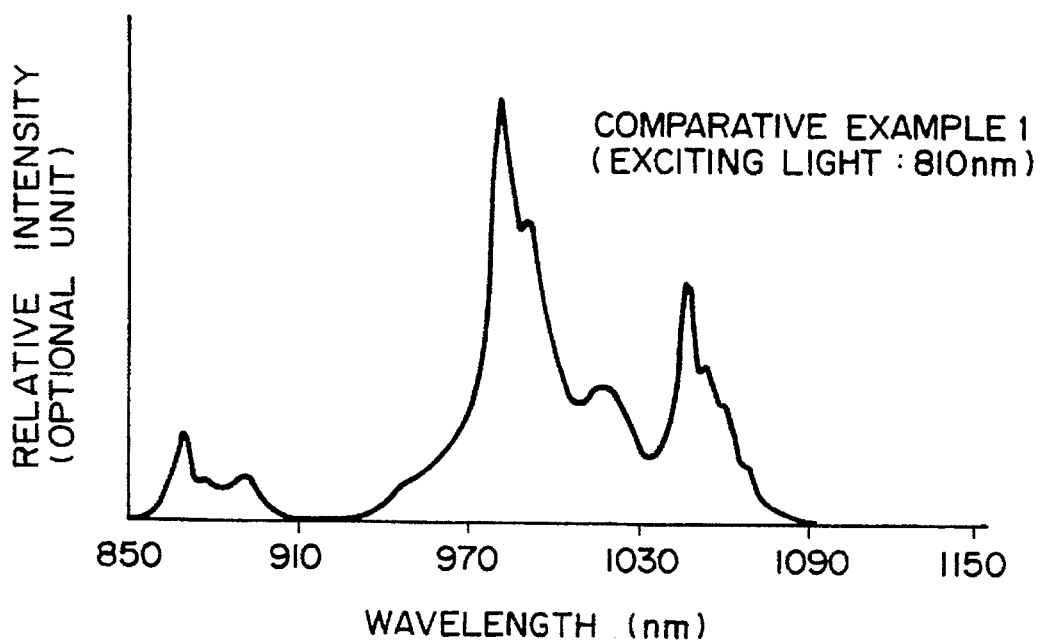

Scanning electron microphotographs of the infrared phosphors obtained in Examples 1 and 10 and Comparative Example 1 are shown in FIG. 10 and emission spectra thereof are shown in FIGS. 11 and 12.

The content of the fine phosphor particles is suitably 50–80% by weight and this is 75% by weight in this example. When the content is less than 50% by weight, output from the print layer 29 is small and when it is more than 80% by weight, printability of the print layer 29 (bar code pattern) deteriorates, which may cause failure in printing.

The binders include, for example, wax, vinyl chloride-vinyl acetate copolymer, ethylene-vinyl acetate copolymer, polyester, polyurethane, polycarbonate, etc. These are used each alone or in admixture of two or more. If necessary, plasticizer, surface active agent and others may further be added.

The fine phosphor particles emit light upon being excited by infrared rays and in order to perform effective excitation of the fine phosphor particles, reflectance of the substrate 27 is set at 20% or higher. That is, by allowing the substrate to have a high reflectance, the infrared rays are reflected at the surface of the substrate 27 to accelerate the excitation of the fine phosphor particles. The reflectance of the substrate 27 can be enhanced by dispersing a white pigment such as titanium oxide in the substrate 27 and retaining it therein as aforementioned. The substrate 27 having a reflectance of 80% is used in this example.

The following Table 1 shows the results of measurement of output voltage and S/N of the print layer 29 when the light reflectance of the substrate 29 is variously changed by adjusting the content of the white pigment.

TABLE 1

| Reflectance of substrate (%) | Output voltage (mV) | S/N |
|---|---|---|
| 2 | 23 | 1.10 |
| 5 | 36 | 1.25 |
| 20 | 61 | 1.61 |
| 30 | 77 | 1.83 |
| 50 | 120 | 2.51 |
| 60 | 130 | 2.93 |
| 80 | 580 | 3.60 |

As is clear from table 1, when the reflectance of the substrate 27 is lower than 20%, sufficient output voltage cannot be obtained and furthermore, S/N is small and therefore, the information cannot be accurately read. On the other hand, when the reflectance of the substrate 27 is 20% or higher, preferably 50% or higher, the output voltage and the S/N are high and the information can be accurately read.

Figure 7:
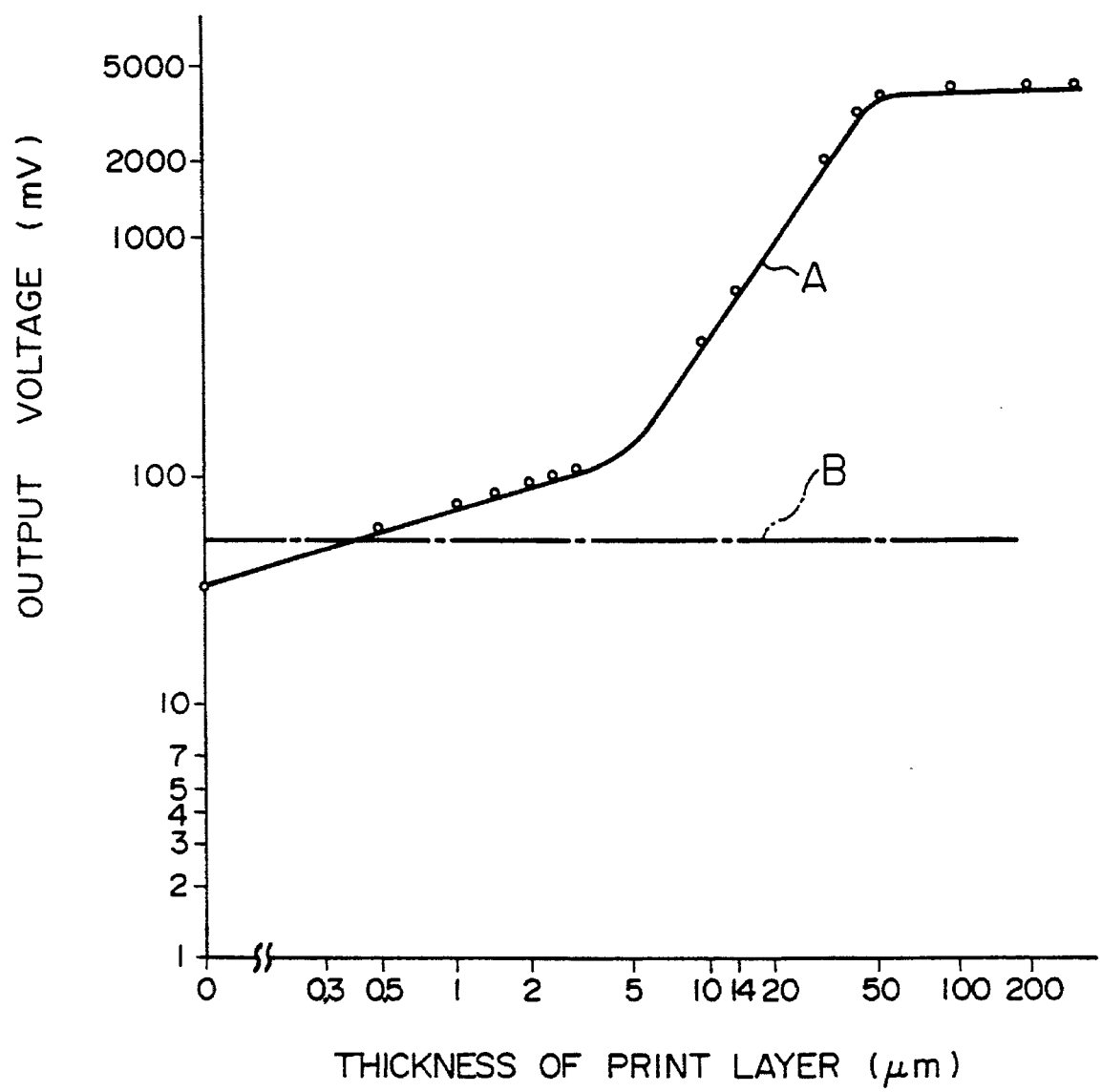
FIG. 7 is a characteristic curve which shows the relation between thickness of the print layer of the card and output voltage.

FIG. 7 is a characteristic curve which shows the relation between the thickness of the print layer 29 and the output voltage. The abscissa axis shows the thickness of the print layer 29 and the ordinate axis shows the output voltage generated by excitation of the print layer 29.

In FIG. 7, A is a characteristic curve which shows the relation between the thickness and the output voltage of the print layer 29 when the print layer 29 is formed on substrate 27 containing a white pigment as aforementioned. The straight line B is a line which shows an output level where the output of the print layer 29 reaches 1.6 time the output voltage of only the substrate i.e. not containing the pigment (average reflectance to the visible light: 80%).

Results of various experiments conducted by the inventors show that when the output voltage of print layer 29 is lower than the level of the straight line B, the information of print layer 29 cannot be sufficiently read and therefore, the output voltage of print layer 29 is required to be higher than 1.6 time this output voltage (straight line B) and the minimum thickness of the print layer 29 at that time is 5 μm as is clear from FIG. 7. With increase in the thickness of print layer 29, the output voltage increases, but becomes nearly constant when the thickness is 50 μm.

When the thickness of print layer 29 exceeds 50 μm, the presence of the print layer 29 itself rather than the latent image therof is perceived depending on the condition of reflection of light. Therefore, it is preferred to limit the thickness of print layer 29 to the range of 0.5–50 μm.

The presence of the print layer 29 can be concealed by forming a hiding layer (not shown) on the whole surface of the card substrate 27 having the print layer 29 thereon so as to cover the print layer 29 (bar code pattern 28).

The print layer 29 and the hiding layer can be formed by heat transfer, ink jet, offset printing, screen printing, etc. Of these methods, the method of successively forming the print layer 29 and the hiding layer by heat transfer using an ink ribbon is especially preferred since the fine print layer containing the phosphor fine particles in a high concentration can be formed and furthermore, layers of the desired thickness can be surely obtained.

FIG. 8 shows timing charts which illustrate the timing of light emission from the light emitting device 9 and the output state of the photo detector 10.

Figure 8A:
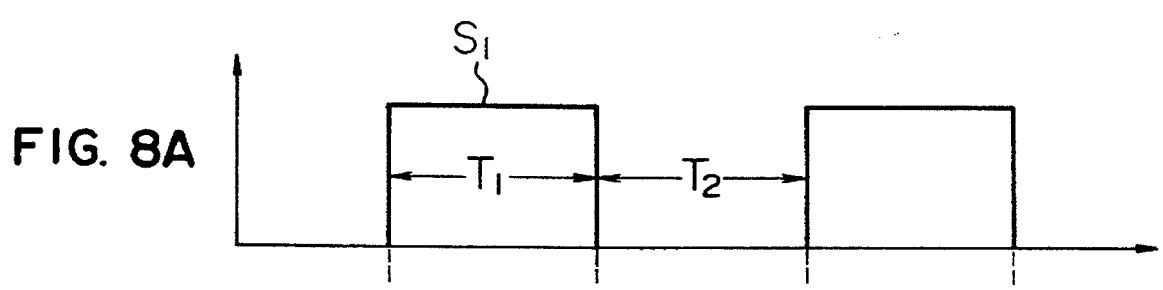
FIGS. 8A, 8B, 8C and 8D show timing charts of the light emitting device and the photo detector in the optical reading apparatus in the example according to the present invention.

As shown in FIG. 8A, the light emitting device 9 works on and off at a nearly equal interval of 500 μsec in its light-on time $T_1$ and light-off time $T_2$ and intermittently irradiates the print layer 29 with infrared rays. In FIG. 8, $S_1$ indicates the light-on signal of light emitting device 9.

Figure 8B:
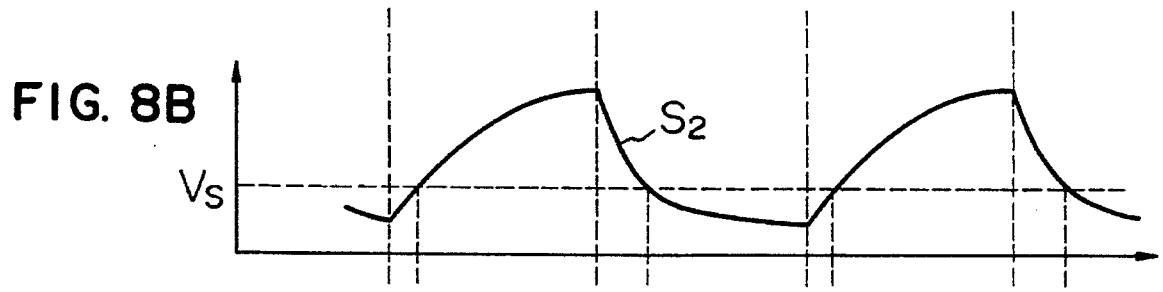
Figure 8C:
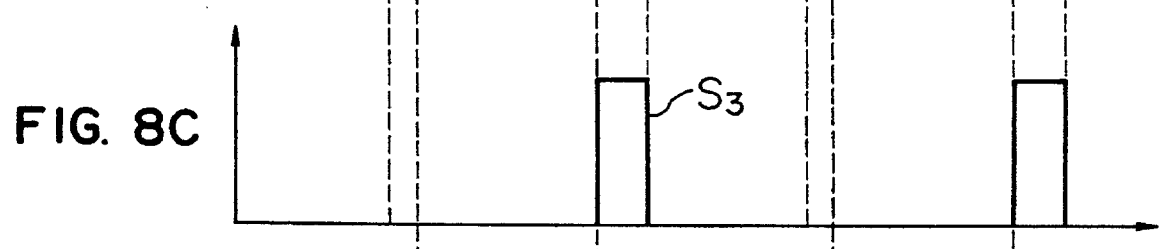

The charts in FIGS. 8B and 8C show the output state of the photo detector 10 when it detects the bar code pattern 28 (print layer 29) and the fine phosphor particles in the bar code pattern are excited by the infrared rays emitted from the light emitting device 9. Therefore, the output increases until the light-on of the light emitting device 9 has ceased as shown in FIG. 8B. Even when irradiation from the light emitting device 9 is stopped, the photo detector 10 detects the afterglow emitted from the bar code pattern 28. Since this afterglow decreases with lapse of time, if a standard value Vs is previously set, a square signal $S_3$ is obtained just after lighting-off of the light emitting device 9 by comparing the detected afterglow with the standard value $V_s$.

Accordingly, the bar code information of the bar code pattern 28 can be optically read by repeating the lighting-on and the lighting-off of the light emitting device 9 with every minute period of time.

As mentioned above, in the method of detecting the afterglow of phosphors, since the light emitting device is off during optical reading of the phosphor, there is no reflected light and so the fluorescence can be detected without using expensive optical filters. Thus, small and inexpensive optical reading systems can be provided.

Figure 8D:
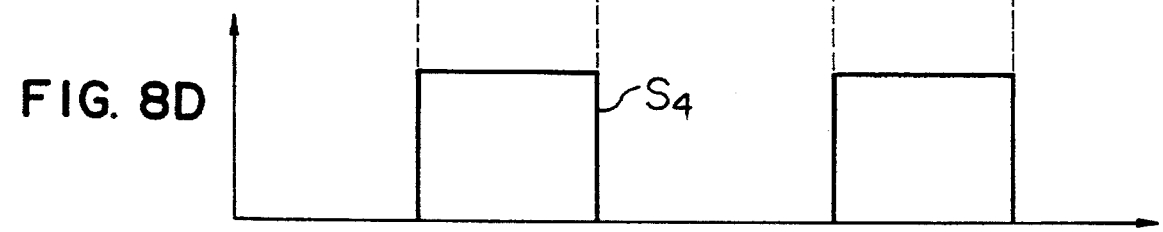

FIG. 8C shows a method of detecting the afterglow from the phosphor, but the light emitted from the phosphor when the light emitting device is on also can be detected by using a filter which intercepts the light in the wavelength region of luminescence center of the light emitting device and transmits the light in the wavelength region of the luminescence center of phosphors. FIG. 8D shows the output state of photo detector 10 in that case.

In the above example, reading of bar code has been explained, but the present invention is not limited thereto and other marks such as figures, symbols and marks of peculiar shapes can also be read.

In the above example, explanation has been given on using a card, but the present invention is not limited thereto, but information of recording media in the other forms such as sheet, bag, slip and the like can also be read.

The optical reading system of the present invention has the following uses and characteristics.

1. For factory automation (FA):

Control in fabrication of automobiles and others. That is, types, countries to which they are to be exported, dates of manufacture, lots of manufacture and others can be controlled using latent image marks without damaging the appearance.

2. In the case of the conventional reflection type bar codes, those which are marked on black materials such as tires or on transparent materials such as glass and plastics cannot be read while these can be read in the case of the latent image marks.

3. Even if letters or designs are printed on the latent image marks, the latent image marks can be read. Therefore, small spaces such as price tags and goods tags can be effectively utilized.

4. For the same reasons as of the above 1 and 3, the system is effective for goods whose design is regarded as important such as cosmetics and drugs or various fancy boxes and packages required to have a feeling of high quality.

5. Under such environments as factories or working fields, the conventional reflective type bar codes cannot be used because of contamination by oil or dust while the latent image marks can be read even under these conditions.

6. For the same reasons as of the above 1 and 3, management information of manufacturers can be put in delivery slips for customers as concealed codes (normally, delivery slips can contain only the information necessary for customers with a blank and format approved by the customers).

7. A card in which an information is put as a concealed code can be used as a game card (bar code game).

8. For the same reasons as of the above 1 and 3, the system can be used for care of books, publications and drawings without damaging the designs.

9. According to the present system, forgery, alteration and falsification are difficult and the system can be applied to control of getting in and out of a room or attending and leaving the office, and to key cards of hotels.

10. Forgery, alteration and falsification of securities or stocks can be prevented.

11. Forgery, alteration and falsification of credit cards, cash cards, telephone cards, etc. can be prevented.

12. Forgery, alteration and falsification of student's identification cards, ID cards, etc. can be prevented and besides, can be reduced in size and can be saved in their space.

13. Forgery, alteration and falsification of stamp cards, point cards, etc. can be prevented and besides, can be reduced in their size and can be saved in their space.

14. Forgery, alteration and falsification of pari-mutuel tickets, bicycle-race tickets, etc. can be prevented.

15. Forgery, alteration and falsification can be prevented by introducing into prize exchanging systems of pinball.

TABLE 2

| | Charged starting materials (g) | | | | | | | | | | |
|---|---|---|---|---|---|---|---|---|---|---|---|
| | $Nd_2O_3$ | $Yb_2O_3$ | $Er_2O_3$ | $Gd_2O_3$ | $Y_2O_3$ | $La_2O_3$ | — | — | $Li_2O_3$ | $NH_4H_2PO_4$ | $LiH_2PO_4$ |
| Example 1 | 3.5 | 4.0 | — | — | 17.5 | — | | | — | — | 65.0 |
| Example 2 | 3.5 | 4.0 | — | 3.6 | 15.3 | — | | | — | — | 65.0 |
| Example 3 | 3.5 | 4.0 | — | 3.6 | 15.3 | — | | | — | 10.0 | 51.0 |
| Example 4 | 0.8 | — | — | — | 21.5 | — | | | — | — | 65.0 |
| Example 5 | 0.8 | — | — | — | 15.3 | 9.8 | | | — | — | 65.0 |
| Example 6 | 0.8 | — | — | 24.5 | — | 9.8 | | | — | — | 65.0 |
| Example 7 | — | 2.5 | — | — | 12.7 | — | | | — | — | 65.0 |
| Example 8 | — | 2.5 | — | 16.8 | — | — | | | — | — | 65.0 |
| Example 9 | — | 7.4 | 0.1 | — | 9.8 | — | | | — | — | 65.0 |
| Example 10 | — | — | 0.1 | — | 6.7 | — | | | — | — | 65.0 |
| Example 11 | 15.2 | — | — | — | — | — | | | — | 10.4 | 46.8 |
| Example 12 | 7.6 | — | — | — | — | 7.3 | | | — | 10.4 | 46.8 |
| Example 13 | 6.8 | 7.8 | — | — | — | — | | | — | 10.4 | 46.8 |
| Comparative Example 1 | 30.0 | 4.0 | — | — | — | — | — | — | 11.0 | 14.0 | — |

| | Firing temperature (°C.) | Composition of infrared phosphor | Particle size (μm) |
|---|---|---|---|
| Example 1 | 700 | $Nd_{0.1}Yb_{0.1}Y_{0.8}PO_4$ | 0.6 |
| Example 2 | 750 | $Nd_{0.1}Yb_{0.1}Gd_{0.1}Y_{0.7}PO_4$ | 0.8 |
| Example 3 | 670 | $Nd_{0.1}Yb_{0.1}Gd_{0.1}Y_{0.7}PO_4$ | 0.4 |
| Example 4 | 850 | $Nd_{0.02}Y_{0.98}PO_4$ | 2.6 |
| Example 5 | 750 | $Nd_{0.2}La_{0.3}Y_{0.68}PO_4$ | 1.0 |
| Example 6 | 700 | $Nd_{0.02}La_{0.3}Gd_{0.68}PO_4$ | 3.3 |
| Example 7 | 750 | $Yb_{0.1}Y_{0.9}PO_4$ | 1.0 |
| Example 8 | 850 | $Yb_{0.1}Gd_{0.9}PO_4$ | 3.5 |

TABLE 2-continued

| | | | |
|---|---|---|---|
| Example 9 | 750 | $Yb_{0.3}Er_{0.005}Y_{0.695}PO_4$ | 0.9 |
| Example 10 | 750 | $Er_{0.005}Y_{0.995}PO_4$ | 0.9 |
| Example 11 | 700 | $LiNdP_4O_{12}$ | 1.2 |
| Example 12 | 700 | $LiNd_{0.5}La_{0.5}P_4O_{12}$ | 1.0 |
| Example 13 | 700 | $LiNd_{0.9}Yb_{0.1}P_4O_{12}$ | 1.5 |
| Comparative Example 1 | 750 | $LiNd_{0.9}Yb_{0.1}P_4O_{12}$ | 6.0 |

What is claimed is:

1. An infrared phosphor having nonacicularly-shaped particles that are less than or equal to 4 μm in size, the phosphor being stimulated to phosphoresce by infrared light, the infrared phosphor comprising a phosphate compound represented by the following formula:

$$Ln_xB_{1-x}PO_4$$

wherein: B represents at least one element selected from the group consisting of Y, La, Gd, Bi, Ce, Lu, In, Pr and Tb; Ln represents at least one element selected from the group consisting of Nd; Yb and Er; and x is a numerical value of 0.01 to 0.99.

2. A phosphor as in claim 1, wherein:
the phosphor, when stimulated by infrared light, phosphoresces in the range of 800 to 1600 nm.

3. An infrared phosphor according to claim 1, wherein the wavelength of the exciting light coincides with that of the emitted light at room temperature.

4. A material having a latent image comprising:
a substrate; and
a print layer on the substrate;
the print layer including:
an infrared phosphor having nonacicularly-shaped particles that are less than or equal to 4 μm in size, the phosphor being stimulated to phosphoresce by infrared light; and
a binder;
wherein the infrared phosphor comprises a phosphate compound represented by the following formula:

$$Ln_xB_{1-x}PO_4$$

and wherein: B represents at least one element selected from the group consisting of Y, La, Gd, Bi, Ce, Lu, In, Pr and Tb; Ln represents at least one element selected from the group consisting of Nd, Yb and Er; and x is a numerical value of 0.01 to 0.99.

5. A material having a latent image according to claim 4, wherein the wavelength of the exciting light coincides with that of the emitted light at room temperature.

6. A material having a latent image according to claim 4, wherein thickness of the infrared exciting print layer is in the range of 0.5 to 50 μm.

7. A material having a latent image according to claim 4, wherein light reflectance of the surface of the substrate on which the print layer is provided is 20% or higher.

8. A material as in claim 4, wherein:
the phosphor, when stimulated by infrared light, phosphoresces in the range of 800 to 1600 nm.

9. An optical reading system for detecting phosphorescence of a marking substance on an object, the system comprising:
an infrared light emitter;
a marking substance on the object, the marking substance including an infrared phosphor having nonacicularly-shaped particles that are less than or equal to 4 μm in size, the phosphor being stimulated to phosphoresce by the infrared light from the light emitter; and
a light detector, the light detector operating after the light emitter turns off so as to detect the phosphorescence from the phosphor;
wherein the infrared phosphor of the marking substance on the object comprises a phosphated compound represented by the following formula:

$$Ln_xB_{1-x}PO_4$$

and wherein: B represents at least one element selected from the group consisting of Y, La, Gd, Bi; Ce; Lu, In, Pr and Tb; Ln represent at least one element selected from the group consisting of Nd, Yb and Er; and x is a numerical value of 0.01 to 0.99.

10. An optical reading system as in claim 9, wherein:
the phosphor, when stimulated by infrared light from the light emitter, phosphoresces in the range of 800 to 1600 nm.

11. An optical reading system according to claim 9, wherein the wavelength of the exciting light coincides with that of the emitted light at room temperature.

* * * * *